(12) United States Patent
Ramanan et al.

(10) Patent No.: US 9,180,541 B2
(45) Date of Patent: Nov. 10, 2015

(54) ROTATIONAL-FLOW SPRAY NOZZLE AND PROCESS OF USING SAME

(75) Inventors: Harikrishnan Ramanan, Chandler, AZ (US); Nitin Deshpande, Chandler, AZ (US); Sabina J. Houle, Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/540,552

(22) Filed: Jul. 2, 2012

(65) Prior Publication Data

US 2012/0266972 A1   Oct. 25, 2012

Related U.S. Application Data

(62) Division of application No. 11/613,490, filed on Dec. 20, 2006, now Pat. No. 8,215,536.

(51) Int. Cl.

| | |
|---|---|
| *B23K 1/00* | (2006.01) |
| *B23K 3/08* | (2006.01) |
| *B05B 7/08* | (2006.01) |
| *B05B 15/04* | (2006.01) |
| *B05B 5/03* | (2006.01) |
| *B05B 15/06* | (2006.01) |
| *B23K 35/02* | (2006.01) |
| *B05C 5/02* | (2006.01) |
| *B05B 5/04* | (2006.01) |

(52) U.S. Cl.
CPC ............... *B23K 3/082* (2013.01); *B05B 5/032* (2013.01); *B05B 5/0403* (2013.01); *B05B 7/0861* (2013.01); *B05B 15/0425* (2013.01); *B05B 15/0443* (2013.01); *B05B 15/065* (2013.01); *B05C 5/02* (2013.01); *B23K 35/0244* (2013.01); *Y10T 137/2931* (2015.04)

(58) Field of Classification Search
CPC ............. B05B 7/0861; B05B 15/0425; B05B 15/0443; B05B 15/065; B05B 5/032; B05B 5/0403; B05C 5/02; B23K 35/0244; B23K 3/082
USPC ............................... 228/25, 33; 222/590, 591
See application file for complete search history.

(56) References Cited

U.S. PATENT DOCUMENTS

| | | | |
|---|---|---|---|
| 2,464,821 A | | 3/1949 | Ludwick et al. |
| 2,730,135 A | | 1/1956 | Wallace |
| 3,357,640 A | * | 12/1967 | Grossteinbeck et al. ..... 239/703 |
| 3,639,548 A | | 2/1972 | Ullman et al. |
| 4,004,733 A | * | 1/1977 | Law .................................. 239/3 |

(Continued)

FOREIGN PATENT DOCUMENTS

JP     07-015130     1/1995

OTHER PUBLICATIONS

Office Action 1 for U.S. Appl. No. 11/613,490, dated May 1, 2009, 11 pp. [77.261 (OA1)].

(Continued)

*Primary Examiner* — Erin Saad
(74) *Attorney, Agent, or Firm* — Knoard Raynes Davda & Victor LLP; Alan S. Raynes (57) ABSTRACT

A solder-flux composition is sprayed onto a substrate by rotating the solder-flux composition inside a spray cap, and before the solder-flux liquid exits the spray cap, perturbing the flow thereof with a fluid.

19 Claims, 7 Drawing Sheets

(56) References Cited

U.S. PATENT DOCUMENTS

| | | | |
|---|---|---|---|
| 4,224,086 A | | 9/1980 | Stokes, Jr. et al. |
| 4,416,600 A | | 11/1983 | Lecznar et al. |
| 4,780,130 A | * | 10/1988 | Raman et al. ............ 75/338 |
| 5,219,678 A | | 6/1993 | Hasebe et al. |
| 6,059,853 A | * | 5/2000 | Coombs ............ 75/332 |
| 6,722,553 B2 | | 4/2004 | Master et al. |

OTHER PUBLICATIONS

Response to Office Action 1 for U.S. Appl. No. 11/613,490, dated Jul. 2, 2009, 8 pp. [77.261 (ROA1)].
Office Action 2 for U.S. Appl. No. 11/613,490, dated Nov. 12, 2009, 11 pp. [77.261 (OA2)].
Response to Office Action 2 for U.S. Appl. No. 11/613,490, dated Dec. 29, 2009, 8 pp. [77.261 (ROA2)].
Office Action 3 for U.S. Appl. No. 11/613,490, dated Apr. 1, 2010, 15 pp. [77.261 (OA3)].
Response to Office Action 3 for U.S. Appl. No. 11/613,490, dated Jul. 1, 2010, 9 pp. [77.261 (ROA3)].
Final Office Action 1 for U.S. Appl. No. 11/613,490, dated Sep. 14, 2010, 15 pp. [77.261 (FOA1)].
Response to Final Office Action 1 for U.S. Appl. No. 11/613,490, dated Nov. 15, 2010, 10 pp. [77.261 (RFOA1)].
Advisory Action 1 for U.S. Appl. No. 11/613,490, dated Dec. 3, 2010, 5 pp. [77.261 (AdvAct)].
Pre-Appeal Brief Request for Review 1 for U.S. Appl. No. 11/613,490, dated Jan. 14, 2011, 9 pp. [77.261D1 (PreApplConfReq1)].
Decision on Pre-Appeal Brief Request for Review 1 for U.S. Appl. No. 11/613,490, dated Feb. 8, 2011, 2 pp. [77.261D1 (DecPreApplConfReq1)].
Office Action 5 for U.S. Appl. No. 11/613,490, dated Mar. 17, 2011, 19 pp. [77.261 (OA5)].
Response to Office Action 5 for U.S. Appl. No. 11/613,490, dated Aug. 17, 2011, 9 pp. [77.261 (ROA5)].
Final Office Action 2 for U.S. Appl. No. 11/613,490, dated Oct. 14, 2011, 21 pp. [77.261 (FOA2)].
Pre-Appeal Brief Request for Review 2 for U.S. Appl. No. 11/613,490, dated Jan. 17, 2012, 10 pp. [77.261D1 (PreApplConfReq2)].
Decision on Pre-Appeal Brief Request for Review 2 for U.S. Appl. No. 11/613,490, dated Feb. 22, 2012, 2 pp. [77.261D1 (DecPreApplConfReq2)].
Notice of Allowance for U.S. Appl. No. 11/613,490, dated Mar. 6, 2012, 7 pp. [77.261D1 (NOA1)].

* cited by examiner

ROTATIONAL-FLOW SPRAY NOZZLE AND PROCESS OF USING SAME

This application is a divisional of U.S. patent application Ser. No. 11/613,490 filed Dec. 20, 2006, issued as U.S. Pat. No. 8,215,536 on Jul. 10, 2012, which is hereby incorporated by reference in its entirety.

TECHNICAL FIELD

Embodiments relate generally to integrated circuit devices. In particular, embodiments relate to processes of applying a solder flux to a substrate.

TECHNICAL BACKGROUND

Processors and other integrated circuit chips can generate significant heat. During miniaturization efforts, not only are circuits being crowded into smaller geometries, but also multiple chips are being crowded into smaller packages. Flip-chip configurations are affected by the miniaturization because mounting space is also shrinking.

BRIEF DESCRIPTION OF THE DRAWINGS

In order to depict the manner in which the embodiments are obtained, a more particular description of embodiments briefly described above will be rendered by reference to exemplary embodiments that are illustrated in the appended drawings. Understanding that these drawings depict only typical embodiments that are not necessarily drawn to scale and are not therefore to be considered to be limiting of its scope, the embodiments will be described and explained with additional specificity and detail through the use of the accompanying drawings in which.

DETAILED DESCRIPTION

The present disclosure relates to spray processing of films such as solder flux films on bond pads.

The following description includes terms, such as upper, lower, first, second, etc. that are used for descriptive purposes only and are not to be construed as limiting. The embodiments of an apparatus or article described herein can be manufactured, used, or shipped in a number of positions and orientations. The terms "die" and "chip" generally refer to the physical object that is the basic workpiece that is transformed by various process operations into the desired integrated circuit device. A die is usually singulated from a wafer, and wafers may be made of semiconducting, non-semiconducting, or combinations of semiconducting and non-semiconducting materials. A board is typically a resin-impregnated fiberglass structure that acts as a mounting substrate for the die. A heat spreader in this disclosure is a thin structure that is dual-die-and-dual-heat spreader processed.

Reference will now be made to the drawings wherein like structures will be provided with like reference designations. In order to show the structures of embodiments most clearly, the drawings included herein are diagrammatic representations of various embodiments. Thus, the actual appearance of the fabricated structures, for example in a photomicrograph, may appear different while still incorporating the structures of embodiments. Moreover, the drawings show only the structures useful to understand the embodiments. Additional structures known in the art have not been included to maintain the clarity of the drawings.

Figure 1:
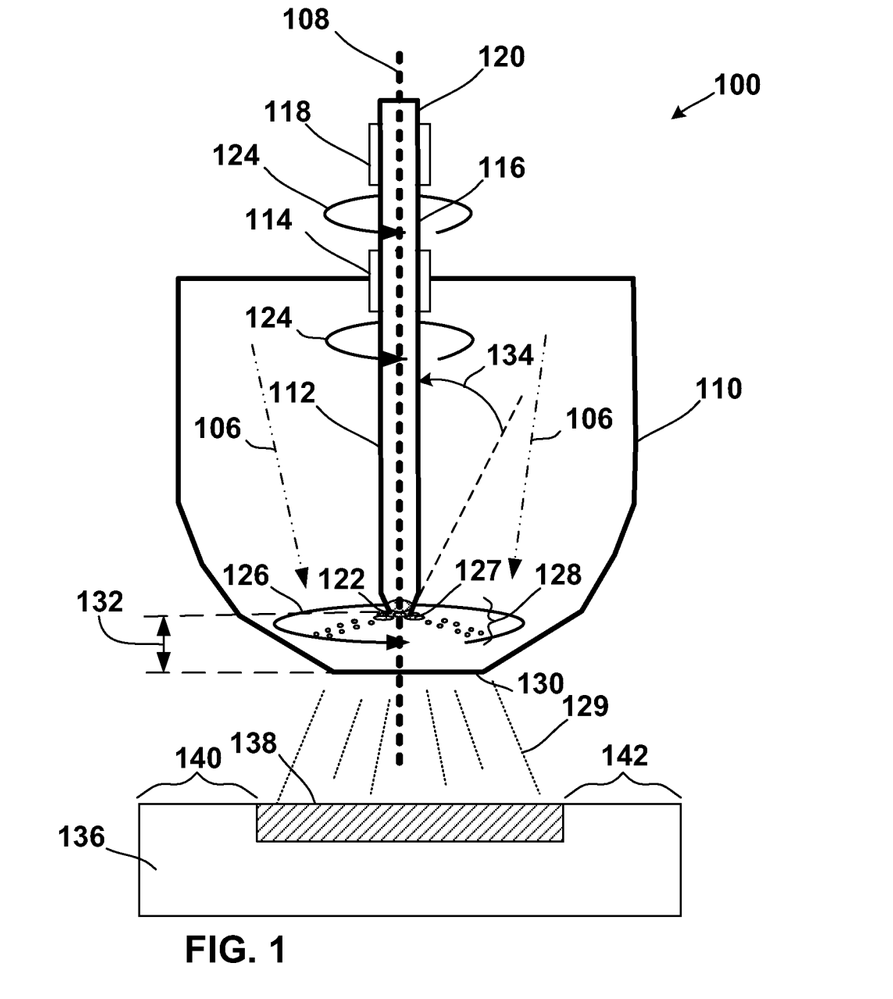
FIG. 1 is a cross-section elevation of a spray nozzle during a process of coating according to an embodiment.

FIG. 1 is a cross-section elevation of a spray apparatus 100 during a process of coating according to an embodiment. The spray apparatus 100 includes a coaxial fluid-flow cap 110 that is configured about a longitudinal symmetry line 108. A solder flux liquid inlet tube 112 is disposed within the coaxial fluid-flow cap 110. A rotatable first fitting 114 allows the solder flux liquid inlet tube 112 to be rotatably coupled to the coaxial fluid-flow cap 110 according to an embodiment. A solder flux liquid supply conduit 116 is coupled to the rotatable first fitting 114 and to a rotatable second fitting 118. The rotatable second fitting 118 is further coupled to a solder flux liquid source 120.

In an embodiment, the coaxial fluid-flow cap 110 and the solder flux liquid inlet tube 112 rotate together, such that the first fitting 114 is not rotatable, but the second fitting is rotatable. In this embodiment, there is one moving coupling.

A fluid flow 106 is also used in FIG. 1 within the regions of the coaxial fluid-flow cap 110 that is outside the solder flux liquid inlet tube 112. The general direction of fluid flow 106 is toward the mouth 122 of the solder flux liquid inlet tube 112 as influenced by the shape of the coaxial fluid-flow cap 110.

As the solder flux liquid inlet tube 112 rotates and solder flux liquid reaches the mouth 122, the solder flux liquid shears into primary fragments 127, and away from the solder flux liquid inlet tube 112 under the centrifugal force that the rotating motion of the solder flux liquid inlet tube 112 imposes upon it. Simultaneously, the fluid flow 106 perturbs the primary fragments 127 of the solder flux liquid and thereby causes the primary fragments 127 to further fragment into secondary fragments 128.

The coaxial fluid-flow cap 110 includes a nozzle 130 through which the secondary fragments 128 must pass. As the secondary fragments 128 of the solder flux liquid exit the nozzle 130, they experience a pressure change and become tertiary fragments 129.

Control of the size of the various fragments 127, 128, and 129 can be done by various methods in FIG. 1. The rate of flow of the solder flux liquid through the solder flux liquid inlet tube 112 is one factor, coupled with the rate of rotation of the solder flux liquid inlet tube 112 that will affect the size of the primary fragments 127. The tip or opening size, the geometry of opening—circular or oval cross-section also affects the size of the fragments prior to influence by coaxial air. In an embodiment, the shape of the mouth 122 is circular. In an embodiment, the shape of the mouth 122 is rectangular such as a square. In an embodiment, the shape of the mouth 122 is eccentric such as an oval. In an embodiment, the shape of the mouth 122 is a combination of rectilinear and curvilinear, such as a star shape with rounded points. In an embodiment, the process wherein a high viscosity flux from 0 to 1000 cp is sheared by rotational motion using coaxial assist through a concentrically rotating cap to limit overspray and aid tighter flux coverage.

The viscosity of the solder flux liquid within the solder flux liquid inlet tube 112 will also act in concert with the rate of flow and the rate of rotation to affect the size of the primary fragments 127.

The quality of the fluid in the fluid flow 106 will also affect the fragmentation of the primary fragments 127. In an embodiment, the fluid in the fluid flow 106 is itself a liquid in an atomized state. In an embodiment, the fluid in the fluid flow 106 is a vapor that behaves like a saturated gas. In an embodiment, the fluid in the fluid flow 106 is a gas. The fluid flow 106 can be referred to as an "air assist," but this term is intended to be an abbreviation of the various fluid flows 106 that have been described. Additionally, when the fluid flow 106 is a gas, it can be a gas that is unreactive to the system of the solder flux liquid.

The exact spacing 132 between the mouth 122 of the solder flux liquid inlet tube 112 and the nozzle 130 is also a factor that affects the size of the secondary fragments 128. The fluid flow 106 has a principal effect upon the primary fragments 127 in this spacing 132. In an embodiment for dimensional analysis, the mouth 122 has a diameter of unit y, and the opening of the nozzle 130 has a diameter in a range from about y to about 10 times y. In an embodiment, the mouth 122 has the diameter of y, and the spacing 132 between the mouth 122 and the nozzle 130 is in a range from about 0.1 times y, to about five times y. In an embodiment, the spacing 132 between the mouth 122 and the nozzle 130 is about 2 mm.

In an embodiment, the mouth 122 has a diameter of y, the opening of the nozzle 130 has a diameter of about five times y, and the spacing 132 between the mouth 122 and the nozzle 130 is about three times y.

In an embodiment, the angle 134 that is placed at the mouth 122 of the solder flux liquid inlet tube 112 creates a backpressure within the solder flux liquid, which acts in antagonism to the shear force that is being directed at the primary fragments 127. Rotational directions are depicted at items 124 and 126. The angle 134 therefore affects the formation of the primary fragments 127. In an embodiment, the angle 134 is in a range from about 1° to about 90° deviation from the vertical. In an embodiment, the angle 134 is about 30° deviation from the vertical. In an embodiment, no angle is formed at the mouth 122 of the solder flux liquid inlet tube 112.

The tertiary fragments 129 are depicted as six streams that are being driven away from the nozzle 130 and toward a substrate 136 that includes a bond pad 138. The tertiary fragments 129 of the solder flux liquid impinge on the bond pad 138 by X-Y placement control of the solder coaxial fluid-flow cap 110. Two keep-out zones (KOZs) 140 and 142 represent locations on the substrate 136 that are not to be significantly contacted with the tertiary fragments 129 of the solder flux liquid.

As the tertiary fragments 129 of the solder flux liquid impinge on the bond pad 138, there is inherent splashing that depends upon the size of the tertiary fragments 129, the velocity, the wetting affinity for the bond pad 138, and the viscosity of the tertiary fragments 129, among others.

FIG. 2 is a cross-section elevation of a spray apparatus 200 during a process of coating according to an embodiment. The spray apparatus 200 includes a coaxial fluid-flow cap 210 that is configured about a longitudinal symmetry line 208. A solder flux liquid inlet tube 212 is disposed within the coaxial fluid-flow cap 210. A rotatable first fitting 214 allows the solder flux liquid inlet tube 212 to be rotatably coupled to the coaxial fluid-flow cap 210 according to an embodiment. A solder flux liquid supply conduit 216 is coupled to the rotatable first fitting 214 and to a rotatable second fitting 218. The rotatable second fitting 218 is further coupled to a solder flux liquid source 220.

In an embodiment, the coaxial fluid-flow cap 210 and the solder flux liquid inlet tube 212 rotate together, such that the first fitting 214 is not rotatable, but the second fitting 218 is rotatable. In this embodiment, there is one moving coupling.

A fluid flow 206 is also used in FIG. 2 within the regions of the coaxial fluid-flow cap 210 that is outside the solder flux liquid inlet tube 212. The general direction of fluid flow 206 is toward the mouth 222 of the solder flux liquid inlet tube 212. The initial direction of the fluid flow 206 is a helical flow stream that originates in a bushing reservoir 244, and that passes into the fluid-flow cap 210 at a fluid-injection port that is a cap-tangent orifice 246. The general direction of the fluid flow 206 is also influenced by the shape of the coaxial fluid-flow cap 210.

As the solder flux liquid inlet tube 212 rotates and solder flux liquid reaches the mouth 222, the solder flux liquid shears into primary fragments 227, and away from the solder flux liquid inlet tube 212 under the centrifugal force that the rotating motion of the solder flux liquid inlet tube 212 imposes upon it. Simultaneously, the fluid flow 206 as an "air assist," perturbs the primary fragments 227 of the solder flux liquid and thereby causes the primary fragments 227 to further fragment into secondary fragments 228.

In an embodiment, the coaxial fluid-flow cap 210 includes a nozzle similar to the nozzle 130 depicted in FIG. 1. Control of the size of the various fragments 227, 228, and 229 can be done by the various methods that are described with respect to the apparatus depicted in FIG. 1.

The exact spacing 232 between the mouth 222 of the solder flux liquid inlet tube 212 and the nozzle 230 is also a factor that affects the size of the secondary fragments 228. The tertiary fragments 229 are depicted as six streams that are being driven away from the nozzle 230 and toward a substrate 236 that includes a bond pad 238. The tertiary fragments 229 of the solder flux liquid impinge on the bond pad 238 by X-Y placement control of the solder coaxial fluid-flow cap 210. Two keep-out zones (KOZs) 240 and 242 represent locations on the substrate 236 that are not to be significantly contacted with the tertiary fragments 229 of the solder flux liquid. Rotational directions are depicted at items 224 and 226.

As the tertiary fragments 229 of the solder flux liquid impinge on the bond pad 238, there is inherent splashing that depends upon the size of the tertiary fragments 229, the velocity, the wetting affinity for the bond pad 238, and the viscosity of the tertiary fragments 229, among others.

FIGS. 3A, 3B, and 3C are time-progressive depictions of a detail section 3 taken from FIG. 2. The depiction in FIGS. 3A, 3B, and 3C are simplified by assuming a streamlined flow of an air-assist fluid. The flow regime can be more complex, such as a turbulent flow of the air-assist fluid, that perturbs the primary fragments.

In FIG. 3A, a primary fragment 227 has exited the solder flux liquid inlet tube 212 (FIG. 2) and is falling away as illustrated by the first vector 348. The first vector 348 represents the effect of the centrifugal force upon the primary fragment 227, as well as the effect of gravity thereupon, if the process is being carried out in a G-field. A second vector 350 represents the flow regime of the fluid flow 206 as it causes a shearing force upon the primary fragment 227. In FIG. 3B, the second vector causes a perturbation upon the integrity of primary fragment 227. The perturbation is represented by the primary fragment 227 beginning to separate into more than one smaller fragments. In FIG. 3C, the second vector 350 has accomplished a further dividing of the primary fragment 227 into a plurality of secondary fragments 228. Splashing of the secondary fragments 228 is less likely than that of the primary fragments 227, where all other factors are considered equal or less significant.

Figure 4:
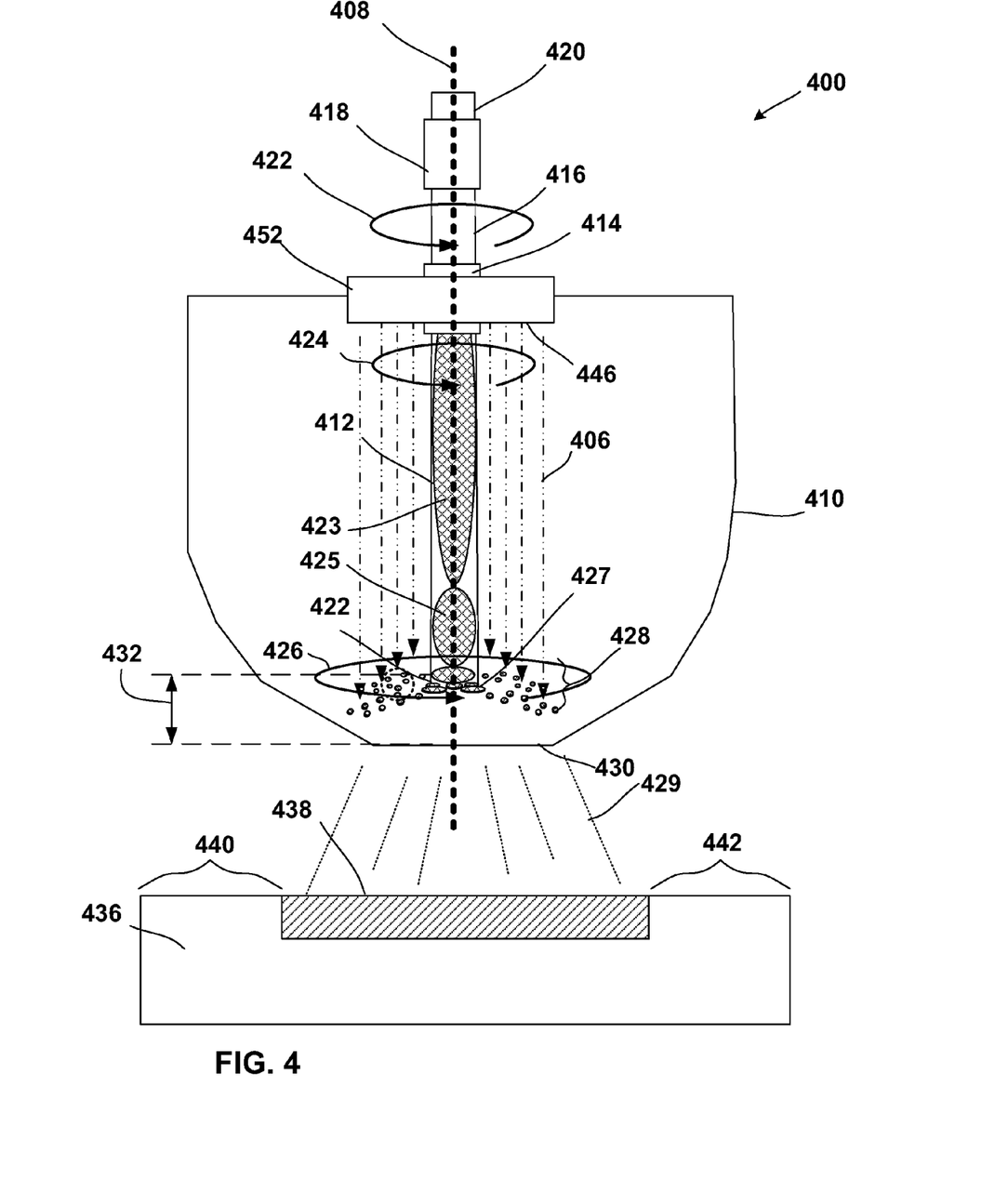
FIG. 4 is a cross-section elevation of a spray apparatus during a process of coating according to an embodiment.

FIG. 4 is a cross-section elevation of a spray apparatus 400 during a process of coating according to an embodiment. The spray apparatus 400 includes a coaxial fluid-flow cap 410 that is configured about a longitudinal symmetry line 408. A solder flux liquid inlet tube 412 is disposed within the coaxial fluid-flow cap 410. A rotatable first fitting 414 allows the solder flux liquid inlet tube 412 to be rotatably coupled to the coaxial fluid-flow cap 410 according to an embodiment. A solder flux liquid supply conduit 416 is coupled to the rotatable first fitting 414 and to a rotatable second fitting 418. The rotatable second fitting 418 is further coupled to a solder flux liquid source 420. Rotational directions are depicted at items 424 and 426.

In an embodiment, the coaxial fluid-flow cap 410 and the solder flux liquid inlet tube 412 rotate together, such that the first fitting 414 is not rotatable but the second fitting 418 is rotatable. In this embodiment, there is one moving coupling.

Figure 3A:
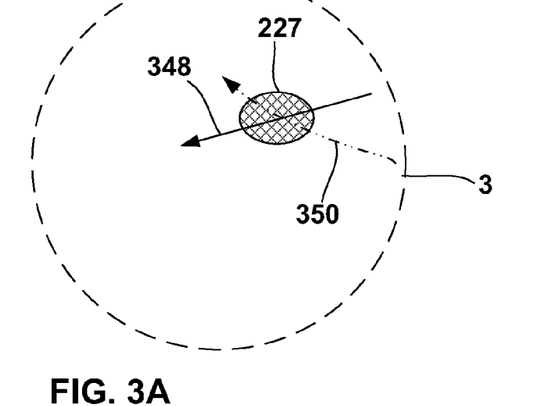
FIGS. 3A, 3B, and 3C are time-progressive depictions of a detail section 3 taken from FIG. 2.
Figure 3B:
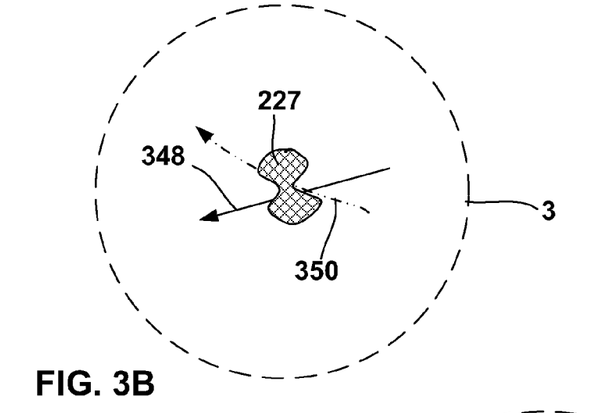
Figure 3C:
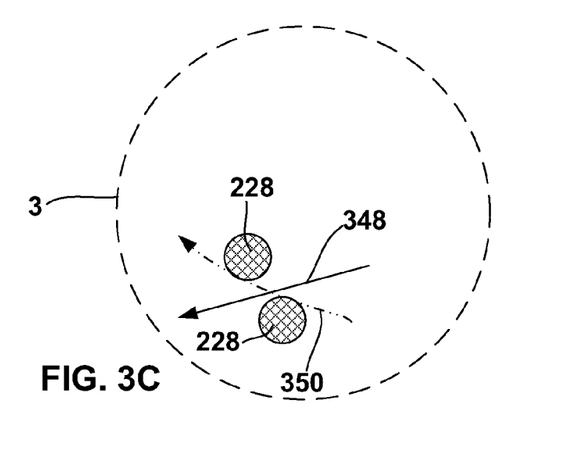

A fluid flow 406 is also used in FIG. 4 within the regions of the coaxial fluid-flow cap 410 that is outside the solder flux liquid inlet tube 412. The general direction of fluid flow 406 is toward the mouth 422 of the solder flux liquid inlet tube 412. The initial direction of the fluid flow 406 is a substantially downward vertical flow stream that originates in a bushing reservoir 452 and that passes into the fluid-flow cap 410 at a fluid-injection port that is a cap-coaxial orifice 446. The general direction of the fluid flow 406 is also influenced by the shape of the coaxial fluid-flow cap 410.

Where the process is conducted in a gravity environment and assuming the orientation of the 400 is a illustrated in FIG. 4, the secondary fragments 428 will have a downward vertical component in the first vector (see FIG. 3A). Nevertheless, the flow regime depicted in FIG. 4 for the fluid flow 406 can be qualified as an "orthogonal perturbation" of the primary fragments. In any event, the quality of the primary fragments are affected by second perturbation of the flow regime from the fluid flow 406. In some embodiments, the perturbation is a substantially orthogonal perturbation. In some embodiments, the perturbation is a nominally contrary to the first vector (see 248 in FIG. 3A). In an embodiment, the second perturbation is even collinear, but the second vector is different in quantity from the first vector.

Figure 2:
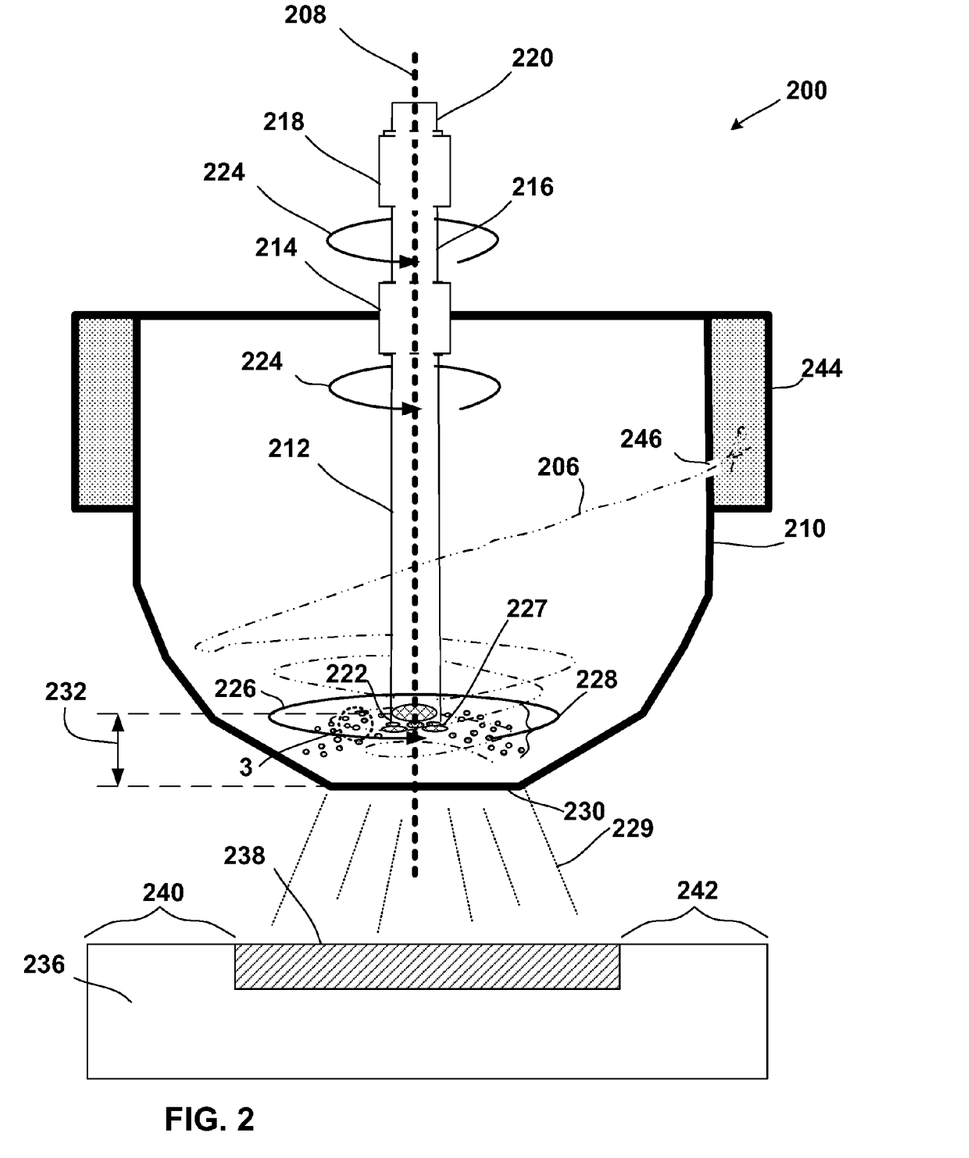
FIG. 2 is a cross-section elevation of a spray nozzle during a process of coating according to an embodiment.

In an embodiment, the coaxial fluid-flow cap 410 includes a nozzle similar to the nozzle 130 depicted in FIG. 1. Control of the size of the various fragments 427, 428, and 429 can be done by the various methods that are described with respect to the apparatus depicted in FIG. 1 and in FIG. 2. As flow of the solder flux liquid develops near the mouth 422, upstream solder flux liquid changes from a plug- or slug flow regime 423, to a transition regime 425, and then to the first fragments 427.

The exact spacing 432 between the mouth 422 of the solder flux liquid inlet tube 412 and the nozzle 430 is also a factor that affects the size of the secondary fragments 428. The tertiary fragments 429 are depicted as six streams that are being driven away from the nozzle 430, and toward a substrate 436 that includes a bond pad 438. The tertiary fragments 429 of the solder flux liquid impinge on the bond pad 438 by X-Y placement control of the solder coaxial fluid-flow cap 410. Two KOZs 440 and 442 represent locations on the substrate 436 that are not to be significantly contacted with the tertiary fragments 429 of the solder flux liquid.

Figure 5:
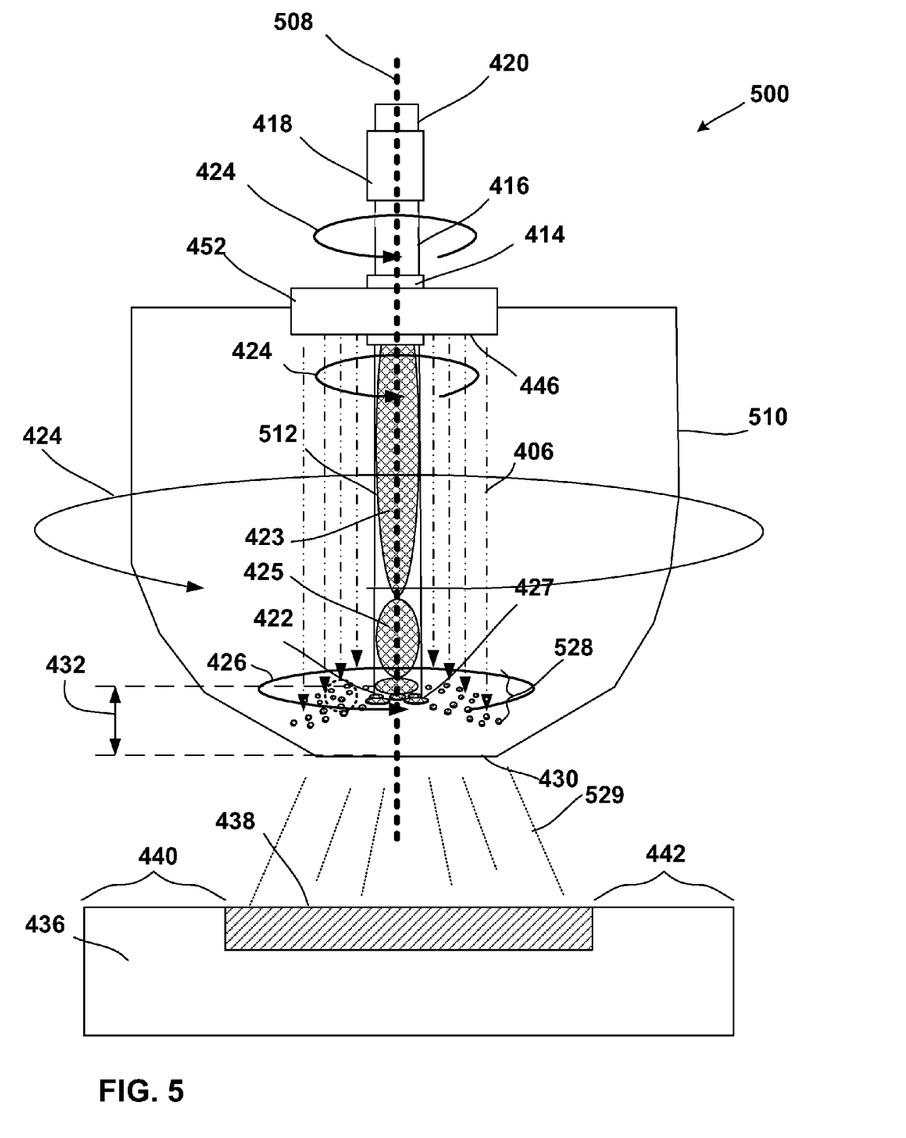
FIG. 5 is a cross-section elevation of a spray apparatus 500 during a process of coating according to an embodiment.

FIG. 5 is a cross-section elevation of a spray apparatus 500 during a process of coating according to an embodiment. The spray apparatus 500 includes a coaxial fluid-flow cap 510 that is configured about a longitudinal symmetry line 508. The structures depicted in FIG. 5 are substantially similar to the structures depicted in FIG. 4. Consequently, the reference numbers are mostly retained. Rotation of the coaxial fluid-flow cap 510 is depicted to be counterclockwise, while rotation of the solder flux liquid inlet tube 512 is depicted to be clockwise. This counter-rotation of the two structures 510 and 512 represents another processing factor that can affect the size of the secondary fragments 528, and consequently, the tertiary fragments 529. In other words, the counter-rotation represents independently rotatable structures between the coaxial fluid-flow cap 510 and the solder flux liquid inlet tube 512. Independently rotatable can mean rotating in the same or opposite directions, but in either cases, not necessarily with the same angular velocity.

Figure 6A:
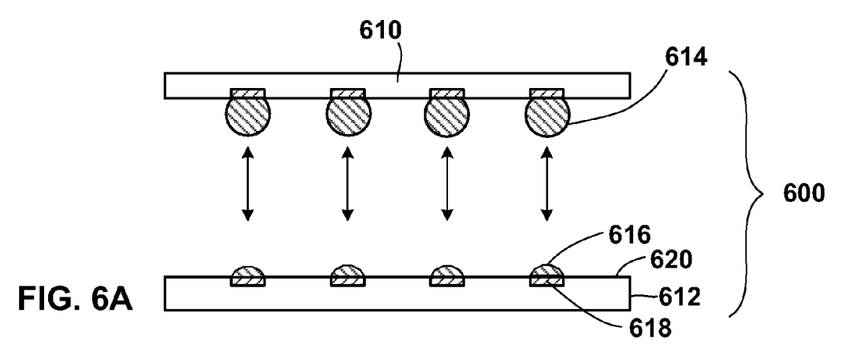
FIG. 6A is a cross-section elevation of a integrated circuit package during solder flux processing according to an embodiment.

FIG. 6A is a cross-section elevation of a integrated circuit package 600 during solder flux processing according to an embodiment. An integrated circuit (IC) die 610 is flip-chip disposed above a mounting substrate 612 and is to be electrically coupled to the mounting substrate 612 through a series of electrical bumps, one of which is indicated with the reference numeral 614.

A solder flux composition 616 is depicted as having been deposited upon the mounting substrate 612. The solder flux composition 616 has wetted a bond pad 618 that is disposed on the upper surface 620 of the mounting substrate 612. Depositing of the solder flux composition 616 is done by X-Y grid spraying according to an embodiment.

Figure 6B:
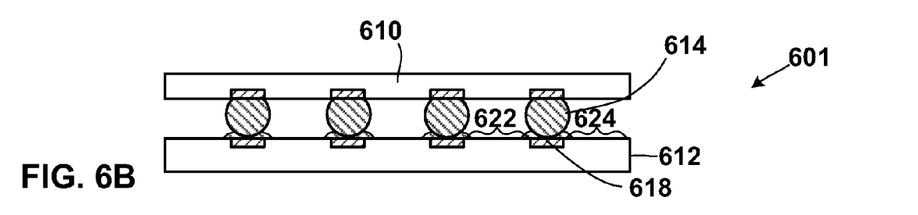
FIG. 6B is a cross-section elevation of the integrated circuit package depicted in FIG. 6A after further processing.

FIG. 6B is a cross-section elevation of the integrated circuit package depicted in FIG. 6A after further processing. The IC package 601 depicts reflow of the solder bump 614, such that it is reflowing without the solder drawing too far from the bond pad 618 from a KOZ 622 toward a second KOZ 624. The KOZs are regions that must remain clear of solder flux materials for further packaging needs and that also would create possible solder-wick opens (SWOs) if the solder is allowed to flow into these zones. The KOZ in this case is to be defined as the perimeter enclosing the entire bond-pad array.

Figure 6C:
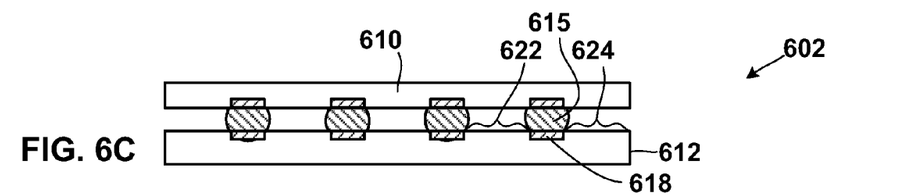
FIG. 6C is a cross-section elevation of the integrated circuit package depicted in FIG. 6B after further processing.

FIG. 6C is a cross-section elevation of the integrated circuit package depicted in FIG. 6B after further processing. The IC package 602 depicts a post flux-removal condition. In an embodiment, a liquid is used to wash any residual flux from the region of the reflowed solder bump 615.

Figure 7:
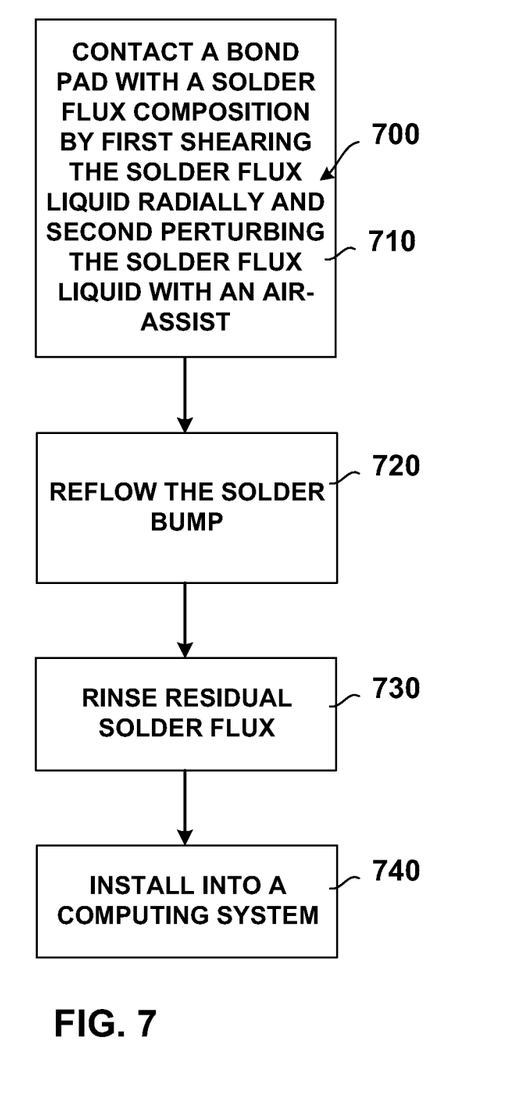
FIG. 7 is a flow chart 700 that describes process flow embodiments.

FIG. 6C also depicts further processing of the IC package 602 such that the IC die 610 has been reflow mounted to the mounting substrate 612. The IC die 610 therefore makes electrical communication to the mounting substrate 612 though the solder bumps 615 FIG. 7 is a flow chart 700 that describes process flow embodiments.

At 710, the process includes contacting a solder flux composition to a mounting substrate under conditions of a first shear force upon the solder flux liquid and a second perturbation force by an air-assist liquid. In an embodiment, the process commences and terminates at 710.

At 720, the process includes heating the solder flux composition to the reflow temperature of the solder bump. In an embodiment, the method commences at 710 and terminates at 720. In an embodiment, the process commences and terminates at 720.

At 730, the process includes washing the package to remove residual solder flux. In an embodiment, the method commences at 710 and terminates at 730.

At 740, the package is installed into a computing system.

Various solder fluxes can be used in the process embodiments. In various embodiments, the solder flux composition may be used as part of a soldering process for forming various integrated circuit devices. For the embodiments, a solder flux composition embodiment may remove oxide from a surface onto which soldering is to occur, thereby increasing the ability of the solder to adhere to the surface of the substrate. In some embodiments, the solder flux composition embodiment may prevent oxide growth on a surface to be soldered as well as decreasing air and/or contaminants at the surface of the substrate.

In an embodiment, a solder flux composition includes tartaric acid. A group of solder flux compositions include the tartaric acid, a resin, an amine, a solvent, and the solution, reaction, and mixture products thereof. The tartaric acid-containing solder flux composition can be obtained from Senju America, Inc. of Great Neck, N.Y. One selected solder flux composition from Senju is Senju 42™.

Where a surfactant is used, sometimes referred to as a flow modifier, the specific surfactant that is employed depends upon compatibility with the solder flux composition. In an embodiment, the surfactant is anionic such as long chain alkyl carboxylic acids, such as lauric acids, steric acids, and the like. In an embodiment, the surfactant is nonionic. Examples of nonionic surfactants are polyethylene oxides, poly propylene oxides, and the like. In an embodiment, the surfactant is cationic, such as alkyl ammonium salts, such as tert butyl ammonium chlorides, or hydroxides. In an embodiment, the flow modifier is provided in a range from about 0.1% to about 10% by weight of the total solder flux composition when it is prepared.

In some embodiments, an amine is used. In an embodiment, the amine is an alkyl substituted amine. In an embodiment, the amine is an ethanol amine. In an embodiment, the amine is an ethoxylated amine. In an embodiment, the amine is a propoxylated amine.

In an embodiment, a liquid primary aromatic diamine is used. One example liquid primary aromatic diamine is diethyldiaminotoluene (DETDA), which is marketed as ETHACURE® 100 from Ethyl Corporation of Richmond, Va. Another example liquid primary aromatic diamine is a dithiomethyldiaminotoluene such as Ethacure® 300. Another example liquid primary aromatic diamine is an alkylated methylenedianiline such as Lapox® K-450 manufactured by Royce International of Jericho, N.Y.

In an embodiment, a liquid hindered primary aliphatic amine is used. One example liquid hindered primary aliphatic amine is an isophorone diamine. Another example liquid hindered primary aliphatic amine is an alkylated methylenedianiline such as Ancamine® 2049 manufactured by Pacific Anchor Chemical Corporation of Allentown, Pa.

In an embodiment, a liquid secondary aromatic amine is used. One example liquid secondary aromatic amine embodiment is an N,N'-dialkylphenylene diamine such as Unilink® 4100 manufactured by DorfKetal of Stafford, Tex. Another example liquid secondary aromatic amine embodiment is an N,N'-dialkylmethylenedianilines: i.e. Unilink® 4200.

In various embodiments, a solder flux composition may comprise less than 40 weight % of the amine.

In an embodiment, a resin is used to provide tackiness of the solder flux composition to the bond pad and the solder bump up to and including the time of reflow. The solder flux composition may include the resin, which may be present in an amount from about 1% to about 20% by weight based on the organic components present.

In an embodiment, a cycloaliphatic epoxy resin is used. In an embodiment, a bisphenol A type epoxy resin is used. In an embodiment, a bisphenol-F type epoxy resin is used. In an embodiment, a novolac epoxy resin is used. In an embodiment, a biphenyl type epoxy resin is used. In an embodiment, a naphthalene type epoxy resin is used. In an embodiment, a dicyclopentadiene-phenol type epoxy resin is used. In an embodiment, a combination of any two of the resins is used.

In an embodiment, a combination of any three of the resins is used. In an embodiment, a combination of any four of the resins is used.

This Detailed Description refers to the accompanying drawings that show, by way of illustration, specific aspects and embodiments in which the present disclosure may be practiced. These embodiments are described in sufficient detail to enable those skilled in the art to practice the disclosed embodiments. Other embodiments may be used and structural, logical, and electrical changes may be made without departing from the scope of the present disclosure. The various embodiments are not necessarily mutually exclusive, as some embodiments can be combined with one or more other embodiments to form new embodiments.

The term "horizontal" as used in this document is defined as a plane parallel to the conventional plane or surface of a wafer or substrate, regardless of the orientation of the wafer or substrate. The term "vertical" refers to a direction perpendicular to the horizontal as defined above. Prepositions, such as "on", "side" (as in "sidewall"), "higher", "lower", "over", and "under" are defined with respect to the conventional plane or surface being on the top surface of the wafer or substrate, regardless of the orientation of the wafer or substrate. The Detailed Description is, therefore, not to be taken in a limiting sense, and the scope of this disclosure is defined only by the appended claims, along with the full scope of equivalents to which such claims are entitled.

The Abstract is provided to comply with 37 C.F.R. §1.72(b) requiring an abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

It will be readily understood to those skilled in the art that various other changes in the details, material, and arrangements of the parts and method stages that have been described and illustrated to explain the nature of this invention may be made without departing from the principles and scope of the invention as expressed in the subjoined claims.

What is claimed is:

1. An apparatus comprising:
 a coaxial fluid-flow cap having a longitudinal symmetry line;
 a solder flux liquid inlet tube disposed within the coaxial fluid-flow cap and configured to transmit a solder flux liquid therethrough in a first stream, wherein the solder flux liquid inlet tube is coaxial to the coaxial fluid-flow cap longitudinal symmetry line;
 a fluid-injection port disposed outside of the solder flux liquid inlet tube and spaced apart from the solder flux liquid inlet tube, wherein the fluid-injection port is positioned to distribute a fluid in a second stream that intersects with the first stream from the solder flux liquid inlet tube;
 a supply of solder flux liquid in communication with the solder flux liquid inlet tube.

2. The apparatus of claim 1, wherein the solder flux liquid inlet tube is rotatably coupled to the coaxial fluid-flow cap, and wherein the coaxial fluid-flow cap is independently rotatable relative to the solder flux liquid inlet tube.

3. The apparatus of claim 1, wherein the coaxial fluid-flow cap includes a side surface surrounding the solder flux liquid inlet tube, and wherein the fluid-injection port comprises an orifice disposed in the side surface.

4. The apparatus of claim 1, wherein the solder flux liquid inlet tube includes a contoured mouth with an angle that deviates from the vertical between about 1° and about 30°.

5. The apparatus of claim 1, wherein the solder flux liquid inlet tube includes a mouth having a mouth diameter, and wherein the coaxial flow cap includes a nozzle having a nozzle diameter in a range from that of the mouth diameter to about 10 times that of the mouth diameter, and wherein the spacing between the mouth and the nozzle is in a range from about 0.1 times that of the mouth diameter to about five times that of the mouth diameter.

6. The apparatus of claim 1, wherein the solder flux liquid inlet tube includes a mouth having a mouth diameter, and wherein the coaxial flow cap includes a nozzle having a nozzle diameter of about five times that of the mouth diameter, and wherein the spacing between the mouth and the nozzle is about three times that of the mouth diameter.

7. A spray apparatus comprising:
a solder flux liquid inlet tube configured to transmit a solder flux liquid therethrough, the solder flux liquid inlet tube including a mouth through which the solder flux liquid is dispensed;
a fluid-injection port disposed outside of the solder flux liquid inlet tube and spaced a distance away from the solder flux liquid inlet tube, the fluid-injection port configured to include at least one opening to dispense a fluid in a path that intersects with the solder flux liquid dispensed from the mouth;
a supply of solder flux liquid in communication with the solder flux liquid inlet tube; and
a fluid-flow cap in which the solder flux liquid inlet tube extends, wherein the fluid-injection port is configured to dispense the fluid within the fluid-flow cap, the fluid flow cap including a first end comprising a nozzle and a second end opposite the first end, wherein the mouth through which the solder flux liquid is dispensed is positioned closer to the nozzle than the second end.

8. The spray apparatus of claim 7, wherein the fluid-flow cap includes a tapered sidewall region that narrows towards the nozzle, wherein the mouth is positioned within the tapered sidewall region.

9. The spray apparatus of claim 7:
wherein the solder flux liquid inlet tube includes an upper end and a lower end, the mouth being positioned at the lower end, the upper end at a higher vertical position than the lower end; and
wherein the fluid-injection port is located at a vertical position that is higher than that of the mouth.

10. The spray apparatus of claim 7, wherein the fluid-injection port comprises an orifice configured to dispense the fluid through a plurality of fluid pathways.

11. A spray apparatus comprising:
a fluid-flow cap;
a supply of solder flux liquid;
a solder flux liquid inlet tube extending within the fluid-flow cap and coaxial therewith, the solder flux inlet tube in communication with the supply of solder flux liquid, the solder flux liquid inlet tube configured to direct a flow of solder flux liquid therethrough in a first stream and form primary solder flux liquid fragments;
a fluid-injection port positioned in the fluid-flow cap and spaced a distance away from the solder flux liquid inlet tube, the fluid-injection port including at least one opening to deliver a fluid in a second stream to intersect with the first stream at a first region to perturb the flow of the primary solder flux liquid fragments and form secondary solder flux liquid fragments; and
a nozzle at an end of the fluid-flow cap, the nozzle positioned downstream from first region the so that a quantity of the solder flux liquid including a plurality of the secondary flux liquid fragments is directed therethrough.

12. The spray apparatus of claim 11, wherein the fluid-flow cap includes a side surface surrounding the solder flux liquid inlet tube, and wherein the fluid-injection port comprises an orifice disposed in the side surface.

13. The apparatus of claim 1, wherein the fluid-flow cap includes a nozzle at a first end thereof, wherein the fluid injection port is positioned adjacent to a second end of the fluid-flow cap opposite the first end.

14. The apparatus of claim 1, further comprising a fluid reservoir in communication with the fluid-injection port.

15. The apparatus of claim 13, wherein the supply of solder flux is positioned apart from the fluid reservoir.

16. The apparatus of claim 15, further comprising a supply of fluid in the fluid reservoir, wherein the fluid comprises a liquid.

17. The apparatus of claim 15, further comprising a supply of fluid in the fluid reservoir, wherein the fluid comprises a gas.

18. The spray apparatus of claim 8, wherein the solder flux liquid inlet tube is rotatably coupled to the fluid-flow cap.

19. The spray apparatus of claim 11, wherein the nozzle is at a first end of the fluid-flow cap, wherein the fluid injection port is positioned adjacent to a second end of the fluid-flow cap opposite the first end, and wherein the fluid injection port is configured to direct the second stream in an initial direction that is parallel to the solder flux inlet tube.

* * * * *